May 1, 1945. W. M. NICHOLSON 2,374,947
HIGH PRESSURE TEST PLUG
Filed May 4, 1943
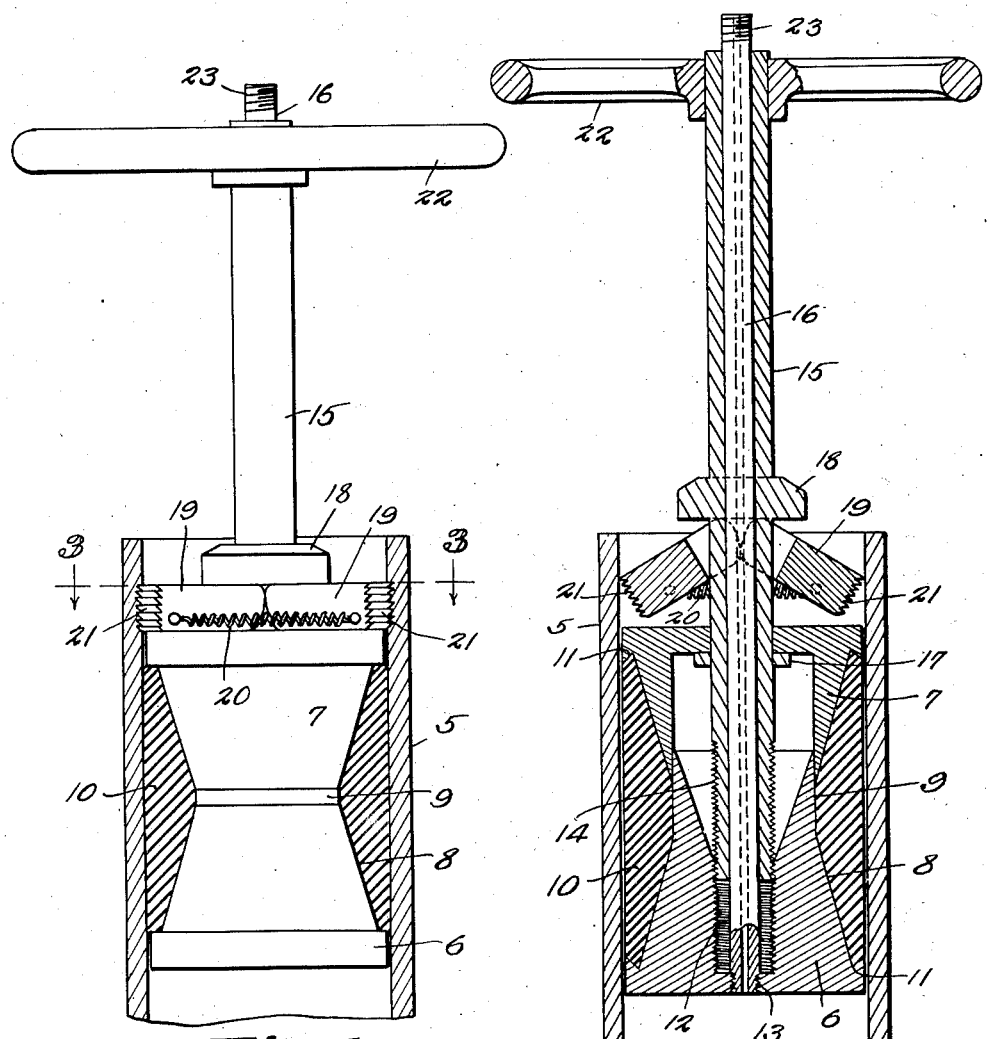
Fig.1.
Fig.2.
Fig.3.
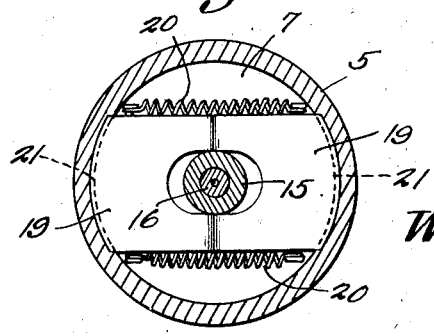
William M. Nicholson
deceased,
INVENTOR.
Mary S. Nicholson
BY Executrix.
Attorneys.

Patented May 1, 1945

2,374,947

UNITED STATES PATENT OFFICE 2,374,947

HIGH PRESSURE TEST PLUG

William M. Nicholson, deceased, late of Ashland, Ky., by Mary S. Nicholson, executrix, Charleston, W. Va., assignor to Gene Le Roy, Charleston, W. Va.

Application May 4, 1943, Serial No. 485,671

4 Claims. (Cl. 138—90)

This invention relates to high pressure test plugs, designed for use in testing pipes, tubes or similar tubular objects, the primary object of the invention being to provide a test plug which may be readily and securely held within a pipe or tubular member to be tested, sealing the pipe or object under test, so that it may be subjected to excessive internal pressure.

An important object of the invention is to provide a test plug of this character embodying expanding sections adjustable with respect to each other, and so constructed that when the sections are moved towards each other, the rubber sleeve, surrounding the sections and forming a part of the plug, will be expanded into close engagement with the pipe or tube under test.

Another object of the invention is to provide means for securely holding the plug within the pipe or tube under test, against being blown therefrom when the object under test is subjected to excessive pressure.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawing:

Figure 1 is a vertical sectional view through a pipe, illustrating a high pressure test plug positioned therein, sealing the end of the pipe.

Figure 2 is a longitudinal sectional view through a pipe and test plug constructed in accordance with the invention, illustrating the positions of the various elements of the plug, prior to positioning the plug for sealing.

Figure 3 is a sectional view taken on line 3—3 of Figure 1.

Referring to the drawing in detail, the reference character 5 designates one end of a pipe to be tested, and in which the test plug, forming the essence of the present invention, is positioned.

The test plug embodies sections 6 and 7, which are circular in cross section, and are of diameters slightly less than the diameter of the pipe or tubular object with which it is used, in completing a high pressure test.

The section 6 is formed with a tapered portion 8 that merges into the straight portion 9 that fits into the section 7, as clearly shown by Figure 2 of the drawing. This structure insures a true movement of one section with respect to the other when the sections are moved with respect to each other in expanding the rubber sleeve 10 which surrounds both sections. The outer surface of the section 7 tapers correspondingly with the tapered portion 8, the tapered portions of the sections providing seats for the sleeve 10. At the outer ends of the tapered portions of the sections, grooves 11 are provided in which the ends of the rubber sleeve rest, securing the rubber sleeve, insuring against movement of the rubber sleeve 10 longitudinally, with respect to the sections of the plug.

The section 6 is formed with a threaded bore 12, and a reduced threaded bore 13, the threaded bore 12, being designed to receive the threaded end 14 of the tubular stem 15.

Extending through the stem 15, is a tube 16 that has a threaded end fitted in the reduced threaded bore 13, where it is welded or otherwise secured against rotation with respect to the section 6 of the plug. Secured on the stem 15, is a washer 17 which engages the section 7, moving the section 7 away from the section 6, when the stem 15 is rotated in an anti-clockwise direction.

Formed on the stem 15, at a point substantially intermediate the ends thereof, is an annular flange 18 that engages the movable jaws 19 that are positioned between the flange and outer end of the section 7 of the plug, as clearly shown by Figure 2. These jaws are formed with cutout portions at their inner ends, the cutout portions being of widths so that the jaws will fit over the tubular stem. Coiled springs 20 have their ends connected to the jaws at points near the biting edges of the jaws, so that the springs will act to draw the biting edges of the jaws inwardly towards each other, under normal conditions. Teeth 21 are formed in the outer ends of the jaws and are adapted to bite into the inner wall of the pipe or tubular object under test, embedding themselves within the surface of the object in such a way as to hold the test plug in position, under excessive pressure.

The inner ends of the jaws 19 bear against the flange 18, with the result that when the tubular stem 15 is rotated, in a clockwise direction, the inner ends of the jaws will be forced downwardly, and the outer ends thereof will be forced into engagement with the inner wall of the pipe or object under test. The hand wheel indicated by the reference character 22 is secured to one end of the tubular stem 15, and affords means whereby the stem 15 may be rotated by the operator.

As shown, the tube 16 is provided with threads 23 to which a suitable threaded nozzle from an air supply hose, may be secured in supplying air under pressure, to the pipe in which the test plug has been positioned.

In the use of the plug, the plug is positioned within the pipe or tubular object to be tested, in a manner as shown by Figure 2 of the drawing. The hand wheel 22 is now rotated in a clockwise direction, causing the tubular stem 15 to be fed into the section 6 of the plug. With the movement of the tubular stem 15 into the section 6, the annular flange 18 exerts pressure against the inner end of the jaws 19, causing the jaws to expand and bite into the inner wall of the object under test. As the jaws 19 move to their securing positions, it will of course be obvious that the section 6 is drawn toward the section 7, the tapered portions of the sections moving over the inclined surfaces of the rubber sleeve 10, expanding the sleeve into close engagement with the surface of the object and providing an airtight seal therebetween. Air or hydraulic pressure may now be directed to the interior of the object under test, subjecting the object to excessive air or hydraulic pressure in making the test.

What is claimed is:

1. In a high pressure plug, a body comprising a pair of tapered sections movable with respect to each other, an expansible sleeve having inner inclined surfaces mounted on the tapered body sections, a tube threaded in one of the sections and adapted to move the sections of the plug over the inclined surfaces of the sleeve, expanding the sleeve, a pair of jaws mounted on the tube adjacent to one end of the body, coiled springs connecting the jaws and adapted to normally move the jaws inwardly, means on the tube for moving said jaws whereby the jaws bite into the wall of an opening in which the plug is positioned, securing the plug against movement.

2. In a high pressure plug, a body comprising a pair of telescoping sections having tapered outer surfaces, an expansible sleeve mounted on the plug and engaging the plug throughout substantially the entire length of the plug, said sleeve adapted to extend into engagement with the wall of an opening, sealing the opening, a tube connected with the body, a pair of jaws having notches adapted to straddle the tube, springs connected with the jaws adjacent to the outer ends thereof and adapted to normally hold the outer ends of the jaws inwardly, and a flange on the tube adapted to engage the jaws, moving the jaws into engagement with the wall of the opening in which the plug is positioned.

3. In a high pressure test plug, a body portion comprising a pair of telescoping sections having tapered outer surfaces, a tube on which the telescoping sections are mounted, a flexible sleeve having a tapered bore, mounted on the tapered surfaces and engaging the plug throughout substantially the entire length of the plug, said tapered surfaces adapted to expand the sleeve into engagement with the wall of the pipe in which the plug is positioned, when the sections of the plug are moved towards each other, sealing the pipe, a pair of pivoted jaws mounted on the tube at one end of the body portion, springs connected with the jaws adjacent to the outer ends of the jaws and adapted to normally draw the outer ends of the jaws inwardly, an annular flange on the tube adapted to engage the jaws moving the jaws outwardly, and said tube adapted to operate to expand the flexible sleeve and simultaneously move the jaws into biting engagement with the pipe, securing the body portion within the pipe.

4. In a high pressure test plug, a body portion comprising a pair of sections movable with respect to each other, one of the sections having a substantially straight end merging into a tapered portion, said straight end being fitted in one end of the cooperating section, an expansible sleeve fitted over the sections and adapted to expand when the sections of the plug are moved towards each other, means for moving the sections with respect to each other, and means for securing the plug against movement within an opening.

MARY S. NICHOLSON,
*Executrix of the Estate of William M. Nicholson, Deceased.*